US008711713B2

United States Patent
Parker et al.

(10) Patent No.: US 8,711,713 B2
(45) Date of Patent: *Apr. 29, 2014

(54) SYSTEMS AND METHODS FOR FLOW MIRRORING WITH NETWORK-SCOPED CONNECTION-ORIENTED SINK

(75) Inventors: Ronald Mark Parker, Boxborough, MA (US); Christopher Michael Leduc, Watertown, MA (US); Morteza Ghodrat, Kanata (CA)

(73) Assignee: Ciena Corporation, Hanover, MD (US)

( * ) Notice: Subject to any disclaimer, the term of this patent is extended or adjusted under 35 U.S.C. 154(b) by 1007 days.

This patent is subject to a terminal disclaimer.

(21) Appl. No.: 12/023,531

(22) Filed: Jan. 31, 2008

(65) Prior Publication Data

US 2009/0080338 A1 Mar. 26, 2009

Related U.S. Application Data

(63) Continuation-in-part of application No. 11/859,973, filed on Sep. 24, 2007.

(51) Int. Cl.
*H04L 12/28* (2006.01)

(52) U.S. Cl.
USPC .......................................... 370/250; 710/316

(58) Field of Classification Search
USPC ............ 370/241, 250; 707/10; 714/5; 726/26
See application file for complete search history.

(56) References Cited

U.S. PATENT DOCUMENTS

| 7,292,573 | B2 * | 11/2007 | LaVigne et al. | 370/390 |
| 7,690,040 | B2 * | 3/2010 | Frattura et al. | 726/26 |
| 7,899,048 | B1 * | 3/2011 | Walker et al. | 370/390 |
| 2005/0278565 | A1 * | 12/2005 | Frattura et al. | 714/5 |
| 2006/0059163 | A1 * | 3/2006 | Frattura et al. | 707/10 |
| 2007/0286086 | A1 * | 12/2007 | Taylor et al. | 370/241 |

* cited by examiner

*Primary Examiner* — Dang Ton
*Assistant Examiner* — Lionel Preval
(74) *Attorney, Agent, or Firm* — Clements Bernard PLLC; Christopher L. Bernard; Lawrence A. Baratta, Jr.

(57) ABSTRACT

Systems and methods for sinking port mirrored from one or more identified flows of data to any node in a network are provided. Moreover, the network is configured to convey the mirrored data to the sink, without the need for any facilities expressly dedicated for this purpose. The present invention removes the requirement to co-locate the sink port within the same logical node. The present invention uses a mirrored flow configured as a provisioned layer two point-to-point connection, such as a Switched Permanent Virtual Circuit (SPVC), Pseudo-Wire (PWE3), a Virtual Local Area Network (VLAN) cross-connect, Provider Backbone Bridging-Traffic Engineering (PBB-TE), and the like. The node with the mirrored port is configured to create copies of the appropriate set of packets (i.e., ingress, egress packets, or both based on provisioning and based on the identified flow), and to forward the packets to the sink port through the provisioned point-to-point connection.

19 Claims, 7 Drawing Sheets

SYSTEMS AND METHODS FOR FLOW MIRRORING WITH NETWORK-SCOPED CONNECTION-ORIENTED SINK

CROSS-REFERENCE TO RELATED APPLICATION(S)

This application is a continuation-in-part of co-pending U.S. patent application Ser. No. 11/859,973 filed Sep. 24, 2007, and entitled "SYSTEMS AND METHODS FOR PORT MIRRORING WITH NETWORK-SCOPED CONNECTION-ORIENTED SINK," the contents of which are incorporated in full by reference herein.

FIELD OF THE INVENTION

The present invention relates generally to packet networks, and more particularly, the present invention provides systems and methods for sinking port mirrored data from one or more particularly identified flows to any node in a network. Moreover, the network, itself, is configured to convey the mirrored flows to the sink, without the need for any facilities expressly dedicated for this purpose.

BACKGROUND OF THE INVENTION

Port mirroring, also known as a roving analysis port, port monitoring, switched port analyzer, and the like, is a method of monitoring network traffic. For example, a switch or the like is configured to forward a copy of each incoming and/or outgoing packet from one port to another port on the same switch where the packet can be monitored. Network administrators and operators use port mirroring as a diagnostic tool or debugging feature. Port mirroring can enable the administrator to keep close track of switch performance and alter it if necessary.

Referring to FIG. 1, a network 10 includes a switch 12 connected to a local area network (LAN)/wide area network (WAN) 14. A client 16 is connected to a first port 18 on the switch 12. To monitor the first port 18, port mirroring is configured on the switch 12, and an analyzer 20 is connected to a second port 22 where the switch 12 mirrors the first port 18. The mirror port 22 is also referred to as a sink port. An administrator configures port mirroring by assigning a port (i.e., port 18) from which to copy all packets and another port (i.e., port 22) where those packets will be sent. A packet bound for (ingress) or heading away (egress) from the first port 18 is forwarded onto the second port 22 as well. The administrator places the analyzer 20 on the port 22 receiving the mirrored data to monitor each segment separately. The analyzer 20 captures and evaluates the data without affecting the client 16 on the original port 18, i.e. the monitoring is independent of the client 16 and the port 18.

Port mirroring is used on switches and the like to send a copy of all network packets seen on one switch port to a network monitoring connection on another switch port. Conventional layer two port mirroring techniques (typically applied to Ethernet ports) allow for all packets received from a port, sent from a port, or both to be copied to one or two other ports in the system (two ports in the case of simultaneous ingress and egress mirroring). As illustrated in FIG. 1, these current techniques require that the sink be a port on the same logical node as the port being mirrored, i.e. port monitoring is operated solely within the switch 12. Per this definition, a node can include multi-shelf arrangements including stacked switches. For example, switch 12 can include multiple shelves in a stacked configuration with the first and second ports 18,22 located on different shelves, i.e. within the same logical node.

Network operators use port mirroring for a variety of applications. For example, government wiretapping requirements under the Communications Assistance for Law Enforcement Act of 1994 (CALEA) regulations require such capability. Also, network operators often use port mirroring for test and problem diagnosis. Disadvantageously, the inability to sink the mirrored data to a port on any arbitrary node in the network is a serious shortcoming. Current techniques require the network operator to dedicate at least one port, and more likely at least two ports on every node in the network to act as mirror sinks. Also, every node in the network would need to connect these mirror sink ports to a test/monitor device, i.e. the analyzer 20, that is either collocated with the network element or which utilizes dedicated transport facilities to backhaul the mirrored data to the test/monitor device.

Additionally, existing port mirroring techniques mirror all traffic on a port. For example, a GbE port could include a single data flow, but to get a mirror of this flow, the entire port is mirrored. Disadvantageously, this leads to needlessly mirroring all traffic on the port, and requiring the specific flow to be access at the mirror sink.

BRIEF SUMMARY OF THE INVENTION

In various exemplary embodiments, the present invention provides systems and methods for sinking one or more flows as port mirrored data to any node in a network through a network-scoped connection-oriented sink. Moreover, the network, itself, is configured to convey the mirrored data to the sink, without the need for any facilities expressly dedicated for this purpose. The present invention removes the requirement to co-locate the sink port within the same logical node as the mirrored port. Additionally, the present invention only mirrors a specific flow from a port, reducing bandwidth requirements for the network-scoped connection-oriented sink. The present invention uses a mirrored flow configured as a provisioned layer two point-to-point connection, such as a Switched Permanent Virtual Circuit (SPVC), Pseudo-Wire (PWE3, i.e. a Multi-Protocol Label Switching (MPLS)-equivalent to the SPVC), a Virtual Local Area Network (VLAN) cross-connect, Provider Backbone Bridging—Traffic Engineering (PBB-TE), and the like.

The provisioned point-to-point connection is configured between the mirrored port to a sink port in the same manner and modality as normal connections, e.g., if Pseudo-Wires are employed, then the point-to-point connect is managed as a normal Pseudo-Wire with all configuration options, debug techniques, statistics, etc. associated with Pseudo-Wire, and likewise for any other connection-oriented technique. The node with the mirrored port is configured to create copies of the appropriate set of packets (i.e., ingress or egress packets or both based on provisioning), and to forward the packets to the sink port over the point-to-point connection. The present invention identifies one or more individual flows based on various port or logical entity techniques to determine which packets are forwarded over the point-to-point connection.

In an exemplary embodiment of the present invention, a flow mirroring method with a network-scoped connection-oriented sink includes specifying one or more flows based on identifiers; provisioning a point-to-point connection from a mirror port to a sink port, wherein the sink port requires no special provisioning for the port mirroring; designating a mirror type of the mirror port; copying packets from the mirror port responsive to the mirror type and the specified one or more flows; and forwarding the copied packets to the sink port on the point-to-point connection. The point-to-point connection includes one of Soft Permanent Virtual Circuits, Pseudo-Wires, Virtual Local Area Network cross-connects, Provider Backbone Bridging—Traffic Engineering, and combinations thereof. The identifiers include one of a physical port, a source and destination media access control (MAC) address, Ethertype, P-bit field, virtual local area network (VLAN) identifier, drop eligibility indicator (DEI), queue-in-queue (Q-in-Q), MAC-in-MAC, a source Internet Protocol (IP) address, Type of Service (ToS) field, Transmission Control Protocol/User Datagram Protocol (TCP/UDP) port number, packet length, protocol ID, and Multiprotocol Label Switched (MPLS) label. The mirror type can include egress, ingress, and egress/ingress. Optionally, the mirror type includes both egress and ingress; and the flow mirroring method further includes adding a unique Virtual Local Area Network (VLAN) tag to egress and ingress flows; and processing the egress and ingress flows at the sink port using the VLAN tag to identify the egress and ingress flows. The sink port can include a port located on a separate network element from the mirror port. Optionally, the provisioning and designating steps are performed remotely by a user through one of a Network Management System, Element Management System, Craft Interface, and combinations thereof, and the copying and forwarding steps are performed by a network element. Alternatively, the mirror port includes a Link Aggregation Group; and the flow mirroring method further includes utilizing a Virtual Local Area Network (VLAN) tag to identify links of the Link Aggregation Group.

In another exemplary embodiment of the present invention, a network element configured for flow mirroring with a network-scoped connection-oriented sink includes a plurality of port adaptors; a forwarding module interconnected to each of the plurality of port adaptors; and a management interface in communication with each of the plurality of port adaptors and the forwarding module; wherein the management interface is configured to: receive a request for mirroring one or more specific flows; transmit the request to one of the plurality of port adaptors and the forwarding module responsive to the request; wherein the one of the plurality of port adaptors responsive to the request is configured to provision a point-to-point connection to a sink port responsive to the request; and wherein the forwarding module responsive to the request is configured to copy and forward packets on the point-to-point connection to the sink port responsive to the request. The point-to-point connection includes one of Soft Permanent Virtual Circuits, Pseudo-Wires, Virtual Local Area Network cross-connects, Provider Backbone Bridging—Traffic Engineering, and combinations thereof. The one or more specific flows are identified based on one of a physical port, a source and destination media access control (MAC) address, Ethertype, P-bit field, virtual local area network (VLAN) identifier, drop eligibility indicator (DEI), queue-in-queue (Q-in-Q), MAC-in-MAC, a source Internet Protocol (IP) address, Type of Service (ToS) field, Transmission Control Protocol/User Datagram Protocol (TCP/UDP) port number, packet length, protocol ID, and Multiprotocol Label Switched (MPLS) label. Optionally, the request for mirroring one or more specific flows includes a designation of a mirror port, a mirror type including egress, ingress, and egress/ingress, and a designation of the sink port. The sink port can include a port located on a separate network element from the mirror port. The network element configured for flow mirroring can further include a management system in communication with the management interface, wherein the management system includes one of a Network Management System, Element Management System, Craft Interface, and combinations thereof.

In yet another exemplary embodiment of the present invention, a network configured for flow mirroring with a network-scoped connection-oriented sink includes a plurality of network elements, wherein the plurality of network elements are interconnected through ports located on each of the plurality of network elements; and means for mirroring one or more specific flows on one of the plurality of network elements to a sink port located on any of the plurality of network elements. The means for mirroring one or more specific flows includes a point-to-point connection to the sink port and means for copying packets of the one or more specific flows for forwarding on the point-to-point connection to the sink port. The one or more specific flows are identified based on one of a physical port, a source and destination media access control (MAC) address, Ethertype, P-bit field, virtual local area network (VLAN) identifier, drop eligibility indicator (DEI), queue-in-queue (Q-in-Q), MAC-in-MAC, a source Internet Protocol (IP) address, Type of Service (ToS) field, Transmission Control Protocol/User Datagram Protocol (TCP/UDP) port number, packet length, protocol ID, and Multiprotocol Label Switched (MPLS) label. The network configured for flow mirroring can further include means for mirroring one or more specific flows in a Link Aggregation Group. Optionally, the network configured for flow mirroring further includes a management system in communication with the plurality of network elements, wherein the management system includes one of a Network Management System, Element Management System, Craft Interface, and combinations thereof. The management system is configured to control the means for mirroring one or more specific flows.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
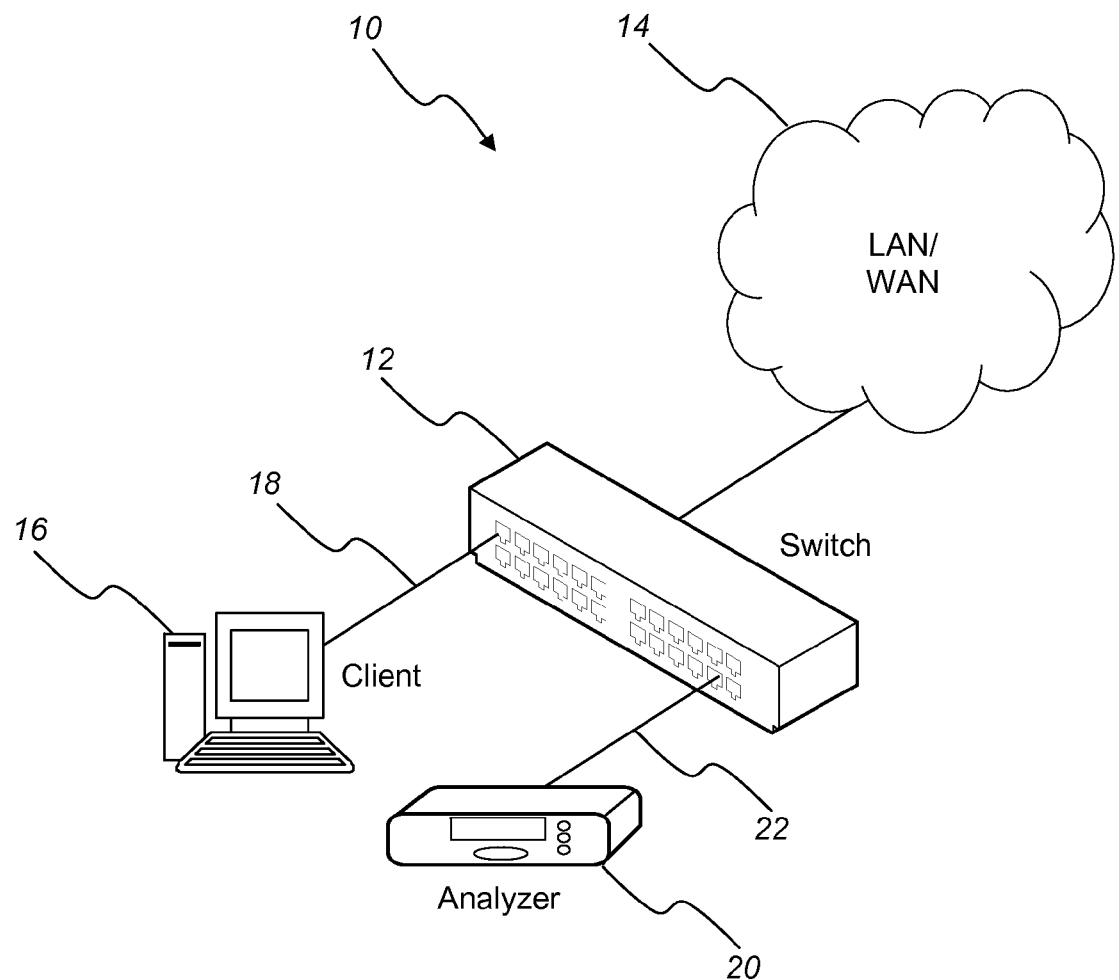
FIG. 1 is a network including a switch connected to a local area network (LAN)/wide area network (WAN)

In various exemplary embodiments, the present invention provides systems and methods for sinking one or more flows as port mirrored data to any node in a network through a network-scoped connection-oriented sink. Moreover, the network, itself, is configured to convey the mirrored data to the sink, without the need for any facilities expressly dedicated for this purpose. The present invention removes the requirement to co-locate the sink port within the same logical node as the mirrored port.

The present invention uses a mirrored flow configured as a provisioned layer two point-to-point connection, such as a Switched Permanent Virtual Circuit (SPVC), Pseudo-Wire (PWE3, i.e. a Multi-Protocol Label Switching (MPLS)-equivalent to the SPVC), a Virtual Local Area Network (VLAN) cross-connect, Provider Backbone Bridging—Traffic Engineering (PBB-TE), and the like. The provisioned point-to-point connection is configured between the mirrored port to a sink port. The node with the mirrored port is configured to create copies of the appropriate set of packets (i.e., ingress or egress packets or both based on provisioning), and to forward the packets to the sink port over the point-to-point connection. The present invention identifies one or more individual flows based on various port or logical entity techniques to determine which packets are forwarded over the point-to-point connection. Of note, the point-to-point connection is treated as a "regular" connection in the network using standards-based connection-oriented techniques.

Advantageously, the present invention increases diagnostics and troubleshooting capabilities allowing the packet flow on any port in the network to be diagnosed even if test equipment is not co-located with the port under test. CALEA compliance is enhanced and simplified allowing any port or flow in the network to be wiretapped remotely. Also, the network has improved device port utilization by removing the requirement to reserve one or more ports in every node as possible mirror sinks. The invention also reduces capital expenses ("CAPEX") and operating costs ("OPEX") by removing excess test equipment and operators. Finally, response time is improved through provisioning at a central location to create a mirrored flow, removing requirements for physical reconnections or patching.

Further, the present invention supports any type of mirroring, i.e., ingress (i.e., traffic arriving to the monitored port), egress (i.e., traffic leaving the monitored port), and simultaneous ingress and egress mirroring to the same sink port. Additionally, the sink port does not have to be specially provisioned, i.e. the sink port is configured as a regular port and is configured to receive only specified flows from the mirrored port. This is because the present invention does not require the sink port to be knowledgeable that its received flow is a mirrored flow. If this were not the case, the present invention would only work with nodes that support this function, i.e. the mirrored port and sink port must both support this functionality. In practice, this would typically require a "book-ended" solution where the same vendor's equipment is on each side. The present invention can support a sink port off of any vendor's equipment since the sink port uses standards-based connection-oriented techniques, and the mirroring functionality is performed solely at nodes configured according to the present invention.

Figure 2:
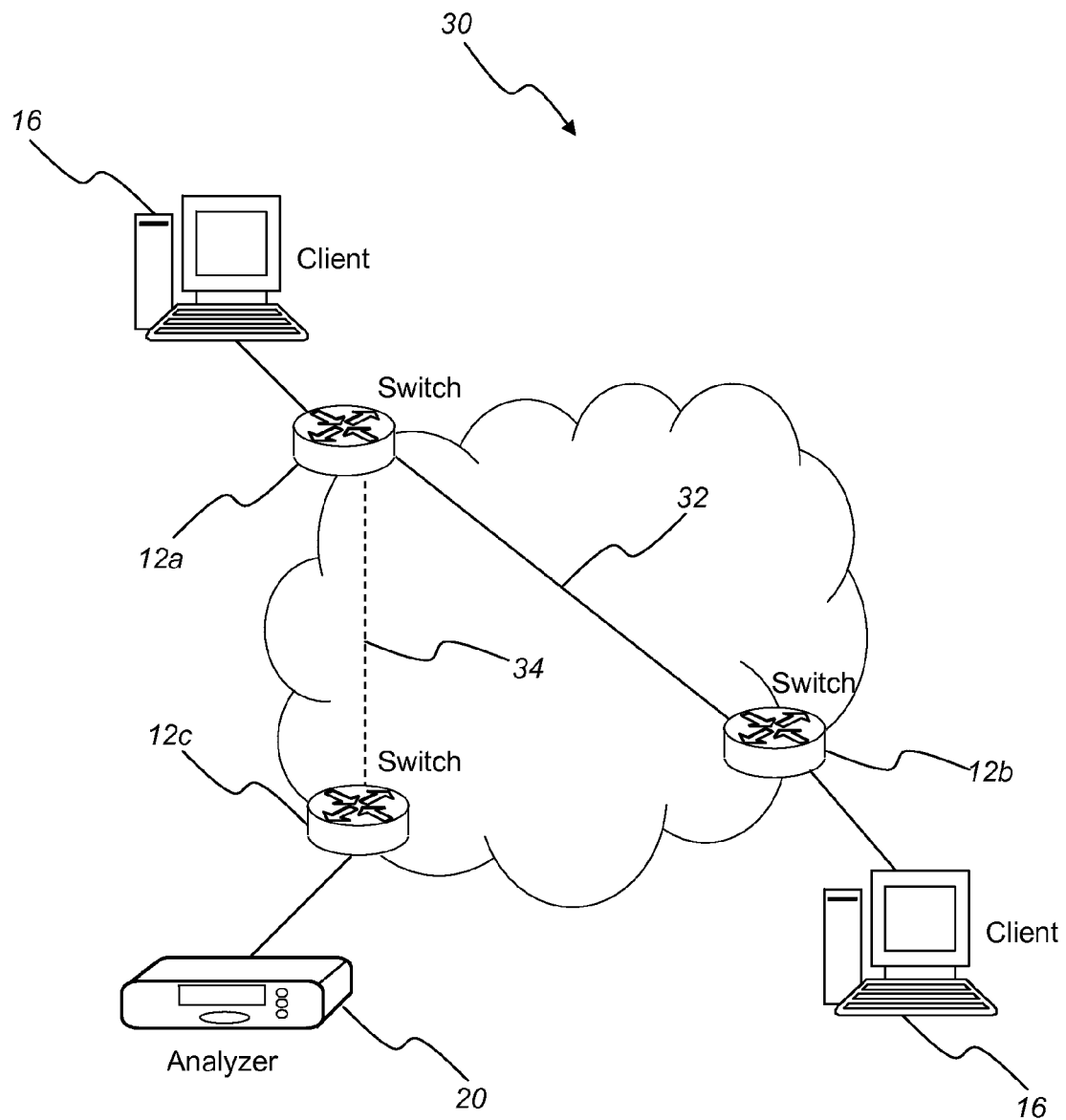
FIG. 2 is a network including multiple interconnected switches with two clients and an analyzer configured for port mirroring, according to an exemplary embodiment of the present invention.

Referring to FIG. 2, a network 30 includes multiple interconnected switches 12a,12b,12c with two clients 16 and an analyzer 20, according to an exemplary embodiment of the present invention. The two clients 16 are connected over a link 32. The link 32 is established from a port in the first switch 12a to a port in the second switch 12b. The present invention provides a mechanism to port mirror the link 32 at a port located on another switch 12c in the network 30. This switch 12c does not have to be part of the same logical node as required by traditional port mirroring schemes. In this exemplary embodiment, the port on the first switch 12a is port mirrored through a link 34 to the third switch 12c. Note, the link 34 can provide egress, ingress, or egress/ingress port mirroring functionality of the link 32 based on user provisioning. Additionally, the first switch 12a does not require dedicated local facilities, i.e. ports, to enable the port mirroring. The network 30 itself conveys the mirrored data to the sink at switch 12c, and the links 32,34 are "regular" network links, i.e. whatever modality is used for regular connections. As described herein, only the switch 12a is required to support the present invention. The switch 12c does not recognize a special mirrored flow, and, in fact, sees link 34 as a regular link of connection-oriented traffic.

The switch 12a is configured to copy and forward specific packets from the link 32 over the link 34 to the switch 12c. In an exemplary embodiment, the specific packets are based on specifically identified flows over the link 32. The links 32,34 can include any type of Ethernet, such as 10/100 Base-T, Gigabit Ethernet (GbE), 10 GbE, etc. Accordingly, each of the link 32,34 can include multiple different identifiable flows. The identifiable flows are used to identify specific customers. Examples of identifiers can include a physical port; any field in a layer two (L2) such as source and destination media access control (MAC) address, Ethertype, P-bit field, virtual local area network (VLAN) identifier, drop eligibility indicator (DEI), queue-in-queue (Q-in-Q), MAC-in-MAC, etc.; any field in a layer three (L3) header such as source Internet Protocol (IP) address, Type of Service (ToS) field, Transmission Control Protocol/User Datagram Protocol (TCP/UDP) port number, packet length, protocol ID, etc.; Multiprotocol Label Switched (MPLS) label; and any other field classifiable in the L2 and L3 header. Specific flows are identified and the switch 12a is configured to copy these packets and forward them on the link 34 to the switch 12c to provide flow mirroring over a network-scoped connection-oriented sink.

The analyzer 20 is a test/monitor device configured to monitor traffic over port mirror links, such as link 34. The analyzer 20, also known as a packet sniffer, test analyzer, protocol analyzer, and the like, is a wire-tap devices that plugs into a port on the switch 12c and eavesdrops on the network traffic. The analyzer 20 is akin to a telephone wiretap device allowing a user to monitor data responsive to port mirroring provisioning. The analyzer 20 is also configured to perform protocol analysis which decodes the data on link 34. Sniffing also has one advantage over telephone wiretaps: many networks use "shared media". The present invention allows sniffing to occur remotely without the need for local analyzers 20 at each switch 12. Advantageously, a single port can be dedicated for port mirroring in the whole network 30, removing the requirement to waste ports on each switch 12a,12b, 12c and the need to have analyzers 20 connected to each switch 12a,12b,12c. Due to the specific flow mirroring, the analyzer 20 is not required to identify specific flows to monitor on the link 34.

Figure 3:
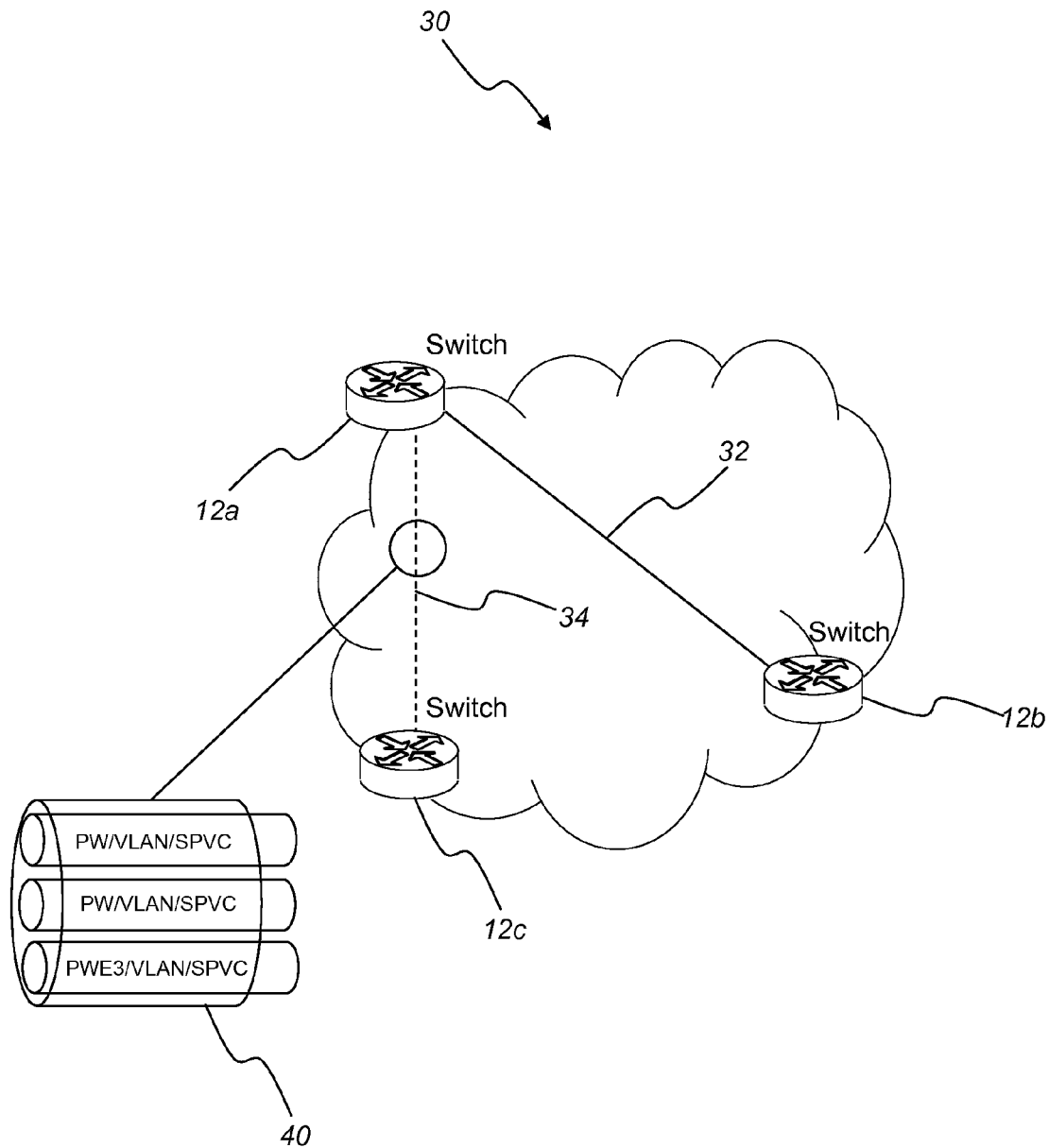
FIG. 3 is the network of FIG. 2 illustrating a provisioning layer two point-to-point connection configured to provide a port mirrored flow, according to an exemplary embodiment of the present invention.

Referring to FIG. 3, the network 30 of FIG. 2 is shown illustrating a provisioning layer two point-to-point connection configured to provide a port mirrored flow 40 of specifically identified flows, according to an exemplary embodiment of the present invention. To enable flow mirroring of a local port at a remote port on another switch 12c, the present invention utilizes the mirrored flow 40 from the local switch 12a to the remote port on the switch 12c. This mirrored flow 40 is provisioned by a user when setting up a port mirrored link 34. Alternately, the mirrored flow 40 can be provisioned through a software module upon the user requesting a port mirror, one or more flows to mirror, and designating the mirrored port, the sink port, and mirror type. The switch 12a is configured to provide mirror types of egress, ingress, or simultaneous egress/ingress flows responsive to provisioning on link 34 of link 32 data.

The mirrored flow 40 is a provisioned layer two point-to-point connection, i.e. using a connection-oriented technique. Such point-to-point connections are common in layer two networks, and can include Soft Permanent Virtual Circuits (SPVCs), Pseudo-Wires (PWE3) which are a Multi-Protocol Label Switching (MPLS) equivalent to SPVCs, Virtual Local Area Network (VLAN) cross-connects, Provider Backbone Bridging—Traffic Engineering (PBB-TE), and the like. With regards to SPVCs and Pseudo-Wires, a connection is established between the switches 12a,12c. The switch 12a is also configured to copy egress, ingress, or egress/ingress traffic from link 32 and send it on link 34 as the mirrored flow 40. With regards to VLAN cross-connects, a VLAN is provisioned between the switches 12a,12c, and the switch 12a is configured to copy traffic from link 32 and perform a VLAN cross-connect of the copied traffic on the provisioned VLAN to switch 12c.

Those of ordinary skill in the art will recognize that any choice of point-to-point connection type can be utilized with the present invention. For example, a network that provides SPVC services could utilize Asynchronous Transfer Mode (ATM) interfaces and the ATM Private Network-to-Network Interface (PNNI) suite of protocols. Also, the network could utilize Ethernet and Packet Over SONET (POS) interfaces with the IP/MPLS suite of protocols.

The point-to-point connection on link 34 is established in the same manner and modality as normal connections such that the sink port requires no special knowledge of the mirrored flow. That is, if Pseudo-wires are employed, then the mirrored connection is managed as a normal Pseudo-wire with all configuration options, debug techniques, statistics, etc. This is also the case for an SPVC over a PNNI network, and for a locally provisioned VLAN cross-connect. Further, the present invention contemplates port mirroring using future connection oriented techniques that may develop. Accordingly, the mechanisms presented herein can be used in any network so long as the node with the mirrored port supports the present invention. There is no requirement that the node with the sink port support the mechanisms described herein except for the standards-based connection-oriented techniques.

Using Pseudo-Wire as an exemplary illustration, a user provisions a Pseudo-Wire from the mirrored port (i.e. link 32) at switch 12a to the sink port (i.e. link 34) at switch 12c. The Pseudo-Wire is configured as an egress, ingress, or egress/ingress mirror which determines which type of data traffic is mirrored from link 32. The Pseudo-Wire is realized across the network 30 in the same manner that "regular" Pseudo-Wires are realized (i.e., through ATM PNNI signaling or MPLS Label Distribution Protocol (LDP) signaling). Once the mirrored flow 40 is configured, the switch 12a is configured to copy the appropriate set of packets (i.e., egress, ingress, or egress/ingress) from the link 32 and progress them on the Pseudo-Wire towards the sink port on switch 12c.

When configuring the mirror as ingress/egress, this takes the form of two distinct connections. In other words, a user has the ability to configure an ingress mirror connection, an egress mirror connection, both, or neither. The ingress and egress mirror connections are configured independently and can, in fact, sink to different nodes and/or ports through a separate point-to-point connection. Additionally, the mirroring mechanisms of the present invention work regardless of the configured modality of the mirror port. For example, the mirrored port's "regular" functionality could be to provide E-line service (via Pseudo-Wire, SPVC, VLAN cross-connect, bridging, and the like), E-LAN service (via MPLS/Virtual Private LAN Service (VPLS)), or layer three Virtual Private Network (VPN) service. As long as the network supports some form of connection-oriented transfer, such as ATM PNNI, MPLS, etc., the type of "regular" service on the mirrored port is irrelevant.

Figure 4:
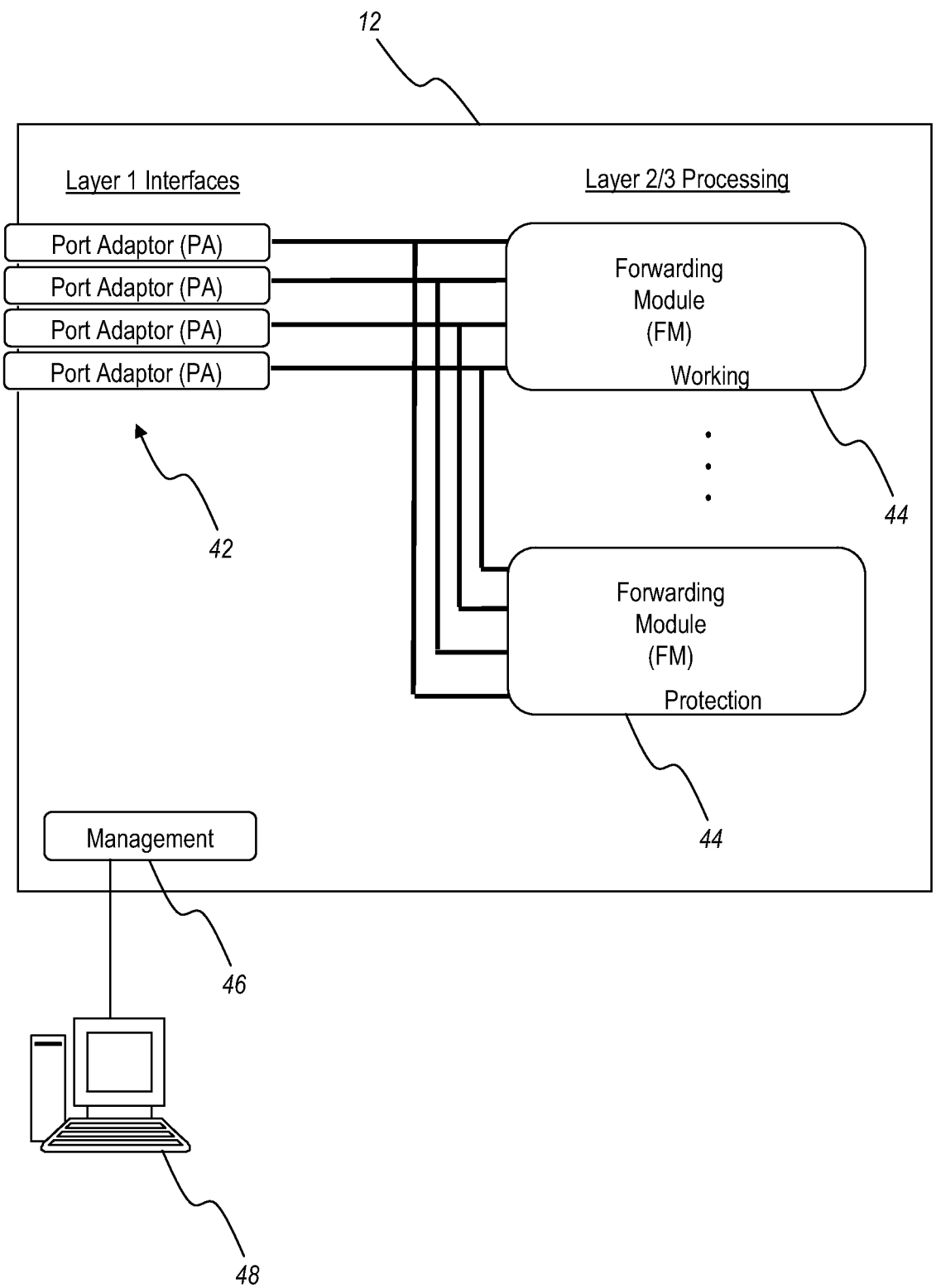
FIG. 4 is a block diagram of the switch in FIGS. 2 and 3 according to an exemplary embodiment of the present invention.

Referring to FIG. 4, a block diagram of the switch 12 is illustrated according to an exemplary embodiment of the present invention. As described herein, the switch 12 is configured to copy packets (i.e., egress, ingress, or egress/ingress) based on specific identifiers from a mirror port and forward them on a point-to-point connection to a designated sink port which is located on another switch 12 or within the same switch 12. The switch 12 generally includes multiple port adaptors 12 interconnected, such as through a backplane, mid-plane, or the like, to working and protect forwarding modules 44. Those of ordinary skill in the art will recognize that the port mirroring mechanisms described herein can apply to any switch or other network element device, and that the switch 12 of FIG. 4 is provided for illustration purposes.

The port adaptors 42 provide physical layer zero/one connectivity to the network. For example, each port adaptor 42 can include multiple, independent ports. Ports can include Ethernet (10/100/1000 GbE), Optical (OC-3/STM-3, OC-12/STM-4, OC-48/STM-16), ATM, DS3/E3, Frame Relay, TDM over Packet, and the like. In FIGS. 2 and 3, the link 32 is formed by a connection on a port adaptor 42 on the first switch 12a to a port adaptor 42 on the second switch 12b, and likewise with the link 34 between the first and third switch 12a,12c. Additionally, the analyzer 20 is configured to connect to the port adaptor 42.

The forwarding modules 44 are configured in a work and protection configuration, such as 1:N and the like. Generally, the forward modules 44 are configured to provide layer two and layer three any-service, any-port forwarding and processing capabilities, traffic management and local switching functionality, including simultaneous support for IP/MPLS and ATM/PNNI control planes. The forwarding modules 44 are fully connected to each of the port adaptors 42 in the switch 12 allowing any-port to any-port functionality.

Additionally, the switch 12 includes a management module 46 or the like configured to provide Operations, Administration, Maintenance, and Provisioning (OAM&P) functions associated with the switch 12. The management module 46 is interconnected to each of the port adaptors 42 and forwarding modules 44, such as through a backplane, mid-plane, or other data connection. Each module 42,44 is configured to communicate status and other OAM&P data to the management module 46. The management module 46 communicates to a management system 48, such as a Network Management System (NMS), Element Management System (EMS), Craft Interface (CI), or the like. The communication can be local or remote over a network. The management system 48 allows a user to perform OAM&P functions. In the present invention, a user can utilize the management system 48 to set up the flow mirroring mechanisms described herein. For example, the user can identify specific flows through the management system 48 for flow mirroring.

In an exemplary embodiment of the present invention, the port adaptors 42 and forwarding modules 44 are configured to establish the point-to-point connections, such as Pseudo-Wire, responsive to flow mirroring provisioning. Also, the port adaptors 42 and forwarding modules 44 are configured to copy an appropriate set of packets (i.e. egress, ingress, or egress/ingress) responsive to provisioning (i.e., specified flows) and forward them towards a sink port. The sink port can also be collocated on the same switch 12 as is provided for in conventional port mirroring mechanisms. For example, the point-to-point connection can be established within the switch 12 between ports on the port adaptors 42. Further, the sink port can be located on any other switch 12 in the network.

The sink port processes a Pseudo-Wire or other point-to-point connection normally, and does not need to explicitly be aware that the Pseudo-Wire is, in fact, a mirrored packet stream. This, in turn, allows the sink port to perform packet header manipulation consistent with any "regular" Pseudo-Wire. For example, if the sink port is an Ethernet port, a VLAN tag can be pushed onto each packet to distinguish the particular mirrored flow. Accordingly, the sink port can simultaneously support any number of mirrored Pseudo-Wires and regular Pseudo-Wires.

Additionally, it is also possible to perform interworking for the mirrored Pseudo-Wire. For example, if the mirrored port is a TDM port containing TDM over Packet Interworking Function (IWF), as described by the MPLS Structure Agnostic TDM over Packet (SATOP) and TDM Circuit Emulation over Packet Switching Networks (CESOPSN) standards, the flow of packets that emerge from or go towards the IWF can be mirrored to any packet-capable port in the network, such as an Ethernet or Packet Over SONET (POS) port. Another example of this type of interworking includes mirroring of an ATM Pseudo-Wire to an Ethernet sink port or an Ethernet Pseudo-Wire to an ATM sink port.

Figure 5:
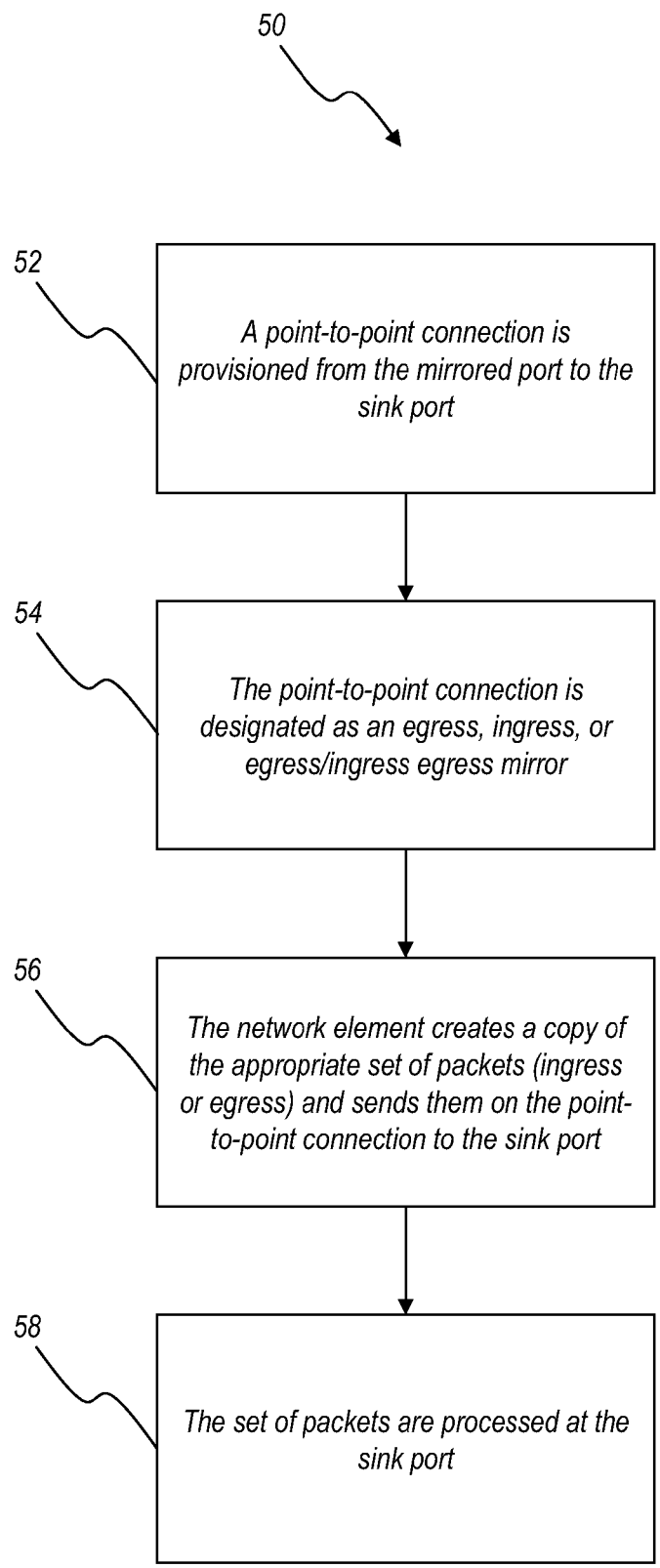
FIG. 5 is a flowchart illustrating port mirroring with a network-scoped connection-oriented sink according to an exemplary embodiment of the present invention.

Referring to FIG. 5, a flowchart illustrates port mirroring 50 with a network-scoped connection-oriented sink according to an exemplary embodiment of the present invention. First, a point-to-point connection is provisioned from the mirrored port to the sink port (step 52). The point-to-point connection provides a connection between the mirrored port and the sink port. The point-to-point connection can include SPVCs, Pseudo-Wires, VLAN cross-connects, PBB-TE, and the like, i.e. any connection-oriented technique. The point-to-point connection is designated as an egress, ingress, or egress/ingress mirror (step 54). This designation determines which type (egress, ingress, or egress/ingress) of packets are copied and forwarded from the mirrored port.

The network element creates a copy of the appropriate set of packets (egress, ingress, or egress/ingress) and sends them on the point-to-point connection to the sink port (step 56). Here, the network element with the mirrored port is configured to copy packets based on provisioning and forward them on the provisioned connection to provide the port mirroring. Finally, the set of packets are processed at the sink port (step 58). For example, an external analyzer device such as a port analyzer can be utilized to monitor the mirrored flow.

The port mirroring 50 can be provisioned through a Network Management System (NMS), Element Management System (EMS), Craft Interface (CI), or the like. These systems can include software modules configured to support the port mirroring 50 process in a single step. For example, a user can designate the mirrored port, type (egress, ingress, or egress/ingress), and the sink port, and the software module can implement the port mirroring 50 automatically.

Figure 6:
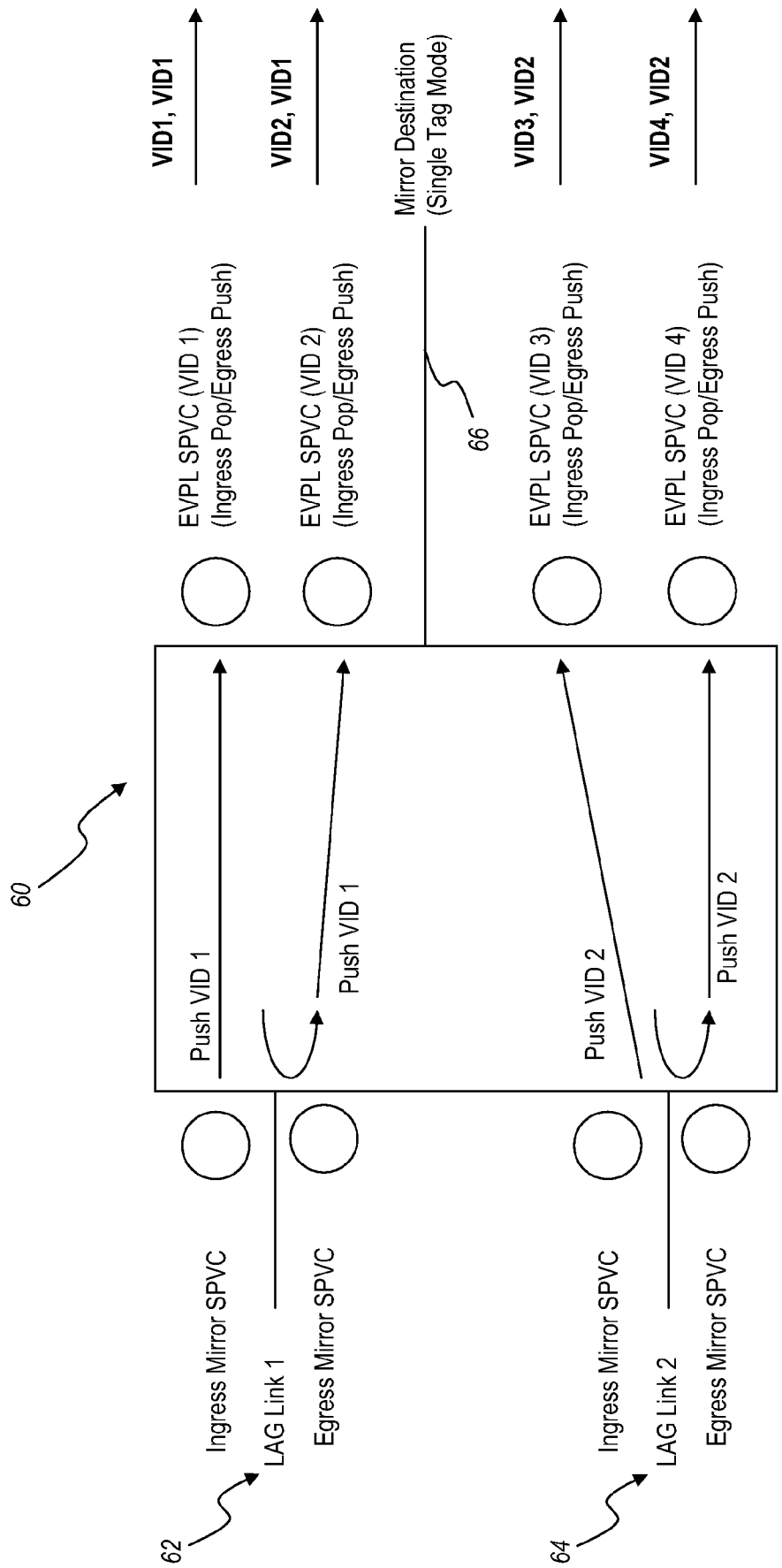
FIG. 6 is a diagram of an Ethernet SPVC with dedicated attributes for mirroring flows with Ethernet LAG links.

Referring to FIG. 6, with regards to an SPVC for the point-to-point connection, an Ethernet SPVC 60 includes dedicated attributes to allow for an "Ingress Port Mirror" SPVC and an "Egress Port Mirror" SPVC. As described herein, mirror connections are largely "regular" connections. As such, in a Pseudo-wire, SPVC, or VLAN cross-connect environment, for example, VLAN tag controls are available. This allows one to mirror both the ingress and egress of the mirror port to the same sink port (assuming bandwidth concerns are accounted for) and to clearly identify each constituent mirrored connection by virtue of adding a unique VLAN tag to each.

Independent of this capability, any given mirrored connection can source from a Link Aggregation Group (LAG). The LAG, in its entirety, is the target of connections—both "regular" and mirror. Again, bandwidth concerns must be accounted for (i.e., mirroring a LAG of 8×1G to a 1G port may not be advisable). At the sink, it can be desirable to clearly indicate from which link of the LAG a packet arrived or to which link of the LAG the packet was destined. Each link can be optionally configured to push a VLAN tag onto a mirrored connection for this purpose.

These two aspects of per-link within the LAG and ingress vs. egress can be combined. That is, we could take both the ingress and the egress from a LAG 62,64 and drive all of it to the same sink port 66. Traffic pushed out the sink port 66 has 2 tags added to the mirrored frames. The outer (first) tag represents ingress vs. egress. The inner (second) tag represents the particular link within the LAG 62,64. Any tags in the original data then follow.

Figure 7:
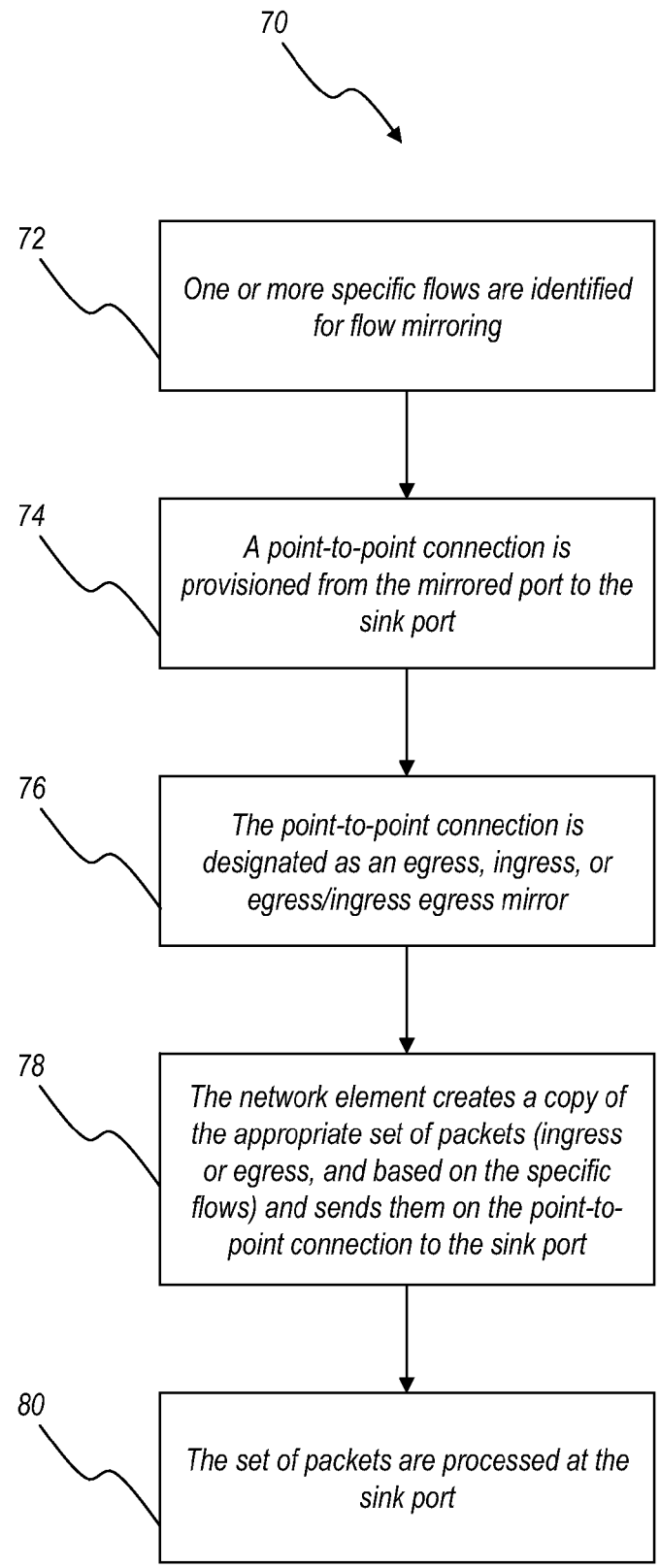
FIG. 7 is a flowchart illustrating flow mirroring with a network-scoped connection-oriented sink according to an exemplary embodiment of the present invention.

Referring to FIG. 7, a flowchart illustrates flow mirroring 70 with a network-scoped connection-oriented sink according to an exemplary embodiment of the present invention. First, one or more specific flows are identified for flow mirroring (step 72). The present invention supports mirroring specific flows based on flow identifiers which are used to identify specific customers. Examples of identifiers can include a physical port; any field in a layer two (L2) such as source and destination MAC address, Ethertype, P-bit field, VLAN identifier, DEI, Q-in-Q, MAC-in-MAC, etc.; any field in a layer three (L3) header such as source IP address, ToS field, TCP/UDP port number, packet length, protocol ID, etc.; MPLS label; and any other field classifiable in the L2 and L3 header.

A point-to-point connection is provisioned from the mirrored port to the sink port (step 74). The point-to-point connection provides a connection between the flows on the mirrored port and the sink port. The point-to-point connection can include SPVCs, Pseudo-Wires, VLAN cross-connects, PBB-TE, and the like, i.e. any connection-oriented technique. The point-to-point connection is designated as an egress, ingress, or egress/ingress mirror (step 76). This designation determines which type (egress, ingress, or egress/ingress) of packets are copied from the specific flows and forwarded from the mirrored port.

The network element creates a copy of the appropriate set of packets (egress, ingress, or egress/ingress, and based on the specific flows) and sends them on the point-to-point connection to the sink port (step 78). Here, the network element with the mirrored port is configured to copy packets based on provisioning and the specific identifiers, and forward them on the provisioned connection to provide the port mirroring. Finally, the set of packets are processed at the sink port (step 80). For example, an external analyzer device such as a port analyzer can be utilized to monitor the mirrored flow.

The flow mirroring 70 can be provisioned through a Network Management System (NMS), Element Management System (EMS), Craft Interface (CI), or the like. These systems can include software modules configured to support the flow mirroring 70 process in a single step. For example, a user can designate the one or more specific flows, mirrored port, type (egress, ingress, or egress/ingress), and the sink port, and the software module can implement the flow mirroring 70 automatically.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A flow mirroring method with a network-scoped connection-oriented sink, comprising:
   specifying one or more flows based on identifiers;
   adding a unique layer two point-to-point connection identification tag to each of the specified one or more flows;
   provisioning a layer two point-to-point connection within an Ethernet switch from a mirror port to a sink port, wherein the sink port requires no special provisioning for the port mirroring, wherein the layer two point-to-point connection is terminated on a second Ethernet switch comprising the sink port;
   designating a mirror type of the mirror port;
   copying packets from the mirror port responsive to the mirror type and the specified one or more flows;
   forwarding the copied packets to the sink port on the provisioned point-to-point connection within the Ethernet switch, wherein the copied packets are addressed to the layer two point-to-point connection to the second Ethernet switch; and
   processing the specified one or more flows at the sink port using the unique layer two point-to-point connection identification tag to identify each of the specified one or more flows;
   wherein the provisioned layer two point-to-point connection comprises a connection-oriented technique established in a same manner and modality as normal connections such that the sink port requires no special knowledge of a mirrored flow and such that the copied packets are forwarded and addressed to the layer two point-to-point connection instead of any device attached to the second Ethernet switch.

2. The flow mirroring method of claim 1, wherein the point-to-point connection comprises one of Soft Permanent Virtual Circuits, Pseudo-Wires, Virtual Local Area Network cross-connects, Provider Backbone Bridging-Traffic Engineering, and combinations thereof.

3. The flow mirroring method of claim 1, wherein the identifiers comprise one of a physical port, a source and destination media access control (MAC) address, Ethertype, P-bit field, virtual local area network (VLAN) identifier, drop eligibility indicator (DEI), queue-in-queue (Q-in-Q), MAC-in-MAC, a source Internet Protocol (IP) address, Type of Service (ToS) field, Transmission Control Protocol/User Datagram Protocol (TCP/UDP) port number, packet length, protocol ID, and Multiprotocol Label Switched (MPLS) label.

4. The flow mirroring method of claim 1, wherein the mirror type comprises egress, ingress, and egress/ingress.

5. The flow mirroring method of claim 1, wherein the mirror type comprises both egress and ingress; and
   wherein the flow mirroring method further comprises:
      adding a unique Virtual Local Area Network (VLAN) tag to egress and ingress flows; and
      processing the egress and ingress flows at the sink port using the VLAN tag to identify the egress and ingress flows.

6. The flow mirroring method of claim 1, wherein the sink port comprises a port located on a separate network element from the mirror port.

7. The flow mirroring method of claim 1, wherein the provisioning and designating steps are performed remotely by a user through one of a Network Management System, Element Management System, Craft Interface, and combinations thereof; and
   wherein the copying and forwarding steps are performed by a network element.

8. The flow mirroring method of claim 1, wherein the mirror port comprises a Link Aggregation Group; and
   wherein the flow mirroring method further comprises utilizing a Virtual Local Area Network (VLAN) tag to identify links of the Link Aggregation Group.

9. A network element configured for flow mirroring with a network-scoped connection-oriented sink, comprising:
   a plurality of port adaptors;
   a forwarding module interconnected to each of the plurality of port adaptors;
   a management interface in communication with each of the plurality of port adaptors and the forwarding module;
   wherein the management interface is configured to:
      receive a request for mirroring one or more specific flows; and
      transmit the request to one of the plurality of port adaptors and the forwarding module responsive to the request;
   wherein the one of the plurality of port adaptors responsive to the request is configured to provision a layer two point-to-point connection within an Ethernet switch to a sink port that is terminated on a second Ethernet switch responsive to the request;
   wherein the forwarding module responsive to the request is configured to copy and forward packets on the provisioned layer two point-to-point connection within the Ethernet switch to the sink port responsive to the request, wherein the copied and forward packets are addressed to the provisioned layer two point-to-point connection to the second Ethernet switch; and
   a processor for processing the one or more specific flows at the sink port using a layer two point-to-point connection identification tag to identify each of the one or more specific flows;
   wherein the provisioned layer two point-to-point connection comprises a connection-oriented technique established in a same manner and modality as normal connections such that the sink port requires no special knowledge of a mirrored flow and such that the copied packets are forwarded and addressed to the layer two point-to-point connection instead of any device attached to the second Ethernet switch.

10. The network element configured for flow mirroring of claim 9, wherein the point-to-point connection comprises one of Soft Permanent Virtual Circuits, Pseudo-Wires, Virtual Local Area Network cross-connects, Provider Backbone Bridging-Traffic Engineering, and combinations thereof.

11. The network element configured for flow mirroring of claim 9, wherein the one or more specific flows are identified based on one of a physical port, a source and destination media access control (MAC) address, Ethertype, P-bit field, virtual local area network (VLAN) identifier, drop eligibility indicator (DEI), queue-in-queue (Q-in-Q), MAC-in-MAC, a source Internet Protocol (IP) address, Type of Service (ToS) field, Transmission Control Protocol/User Datagram Protocol (TCP/UDP) port number, packet length, protocol ID, and Multiprotocol Label Switched (MPLS) label.

12. The network element configured for flow mirroring of claim 9, wherein the request for mirroring one or more specific flows comprises a designation of a mirror port, a mirror type comprising egress, ingress, and egress/ingress, and a designation of the sink port.

13. The network element configured for flow mirroring of claim 12, wherein the sink port comprises a port located on a separate network element from the mirror port.

14. The network element configured for flow mirroring of claim 9, further comprising a management system in communication with the management interface, wherein the management system comprises one of a Network Management System, Element Management System, Craft Interface, and combinations thereof.

15. A network configured for flow mirroring with a network-scoped connection-oriented sink, comprising:
- a plurality of network elements, wherein the plurality of network elements are interconnected through ports located on each of the plurality of network elements;
- means for mirroring one or more specific flows on one of the plurality of network elements to a sink port located on any of the plurality of network elements;
- wherein the means for mirroring one or more specific flows comprise a provisioned layer two point-to-point connection within an Ethernet switch to the sink port and terminating thereon, and means for copying packets of the one or more specific flows for forwarding on the provisioned layer two point-to-point connection within the Ethernet switch to the sink port, wherein the copied packets are addressed to the provisioned layer two point-to-point connection to the second Ethernet switch; and
- means for processing the one or more specific flows at the sink port using a layer two point-to-point connection identification tag to identify each of the one or more specific flows;
- wherein the provisioned layer two point-to-point connection comprises a connection-oriented technique established in a same manner and modality as normal connections such that the sink port requires no special knowledge of a mirrored flow and such that the copied packets are forwarded and addressed to the layer two point-to-point connection instead of any device attached to any of the plurality of network elements.

16. The network configured for flow mirroring of claim 15, wherein the one or more specific flows are identified based on one of a physical port, a source and destination media access control (MAC) address, Ethertype, P-bit field, virtual local area network (VLAN) identifier, drop eligibility indicator (DEI), queue-in-queue (Q-in-Q), MAC-in-MAC, a source Internet Protocol (IP) address, Type of Service (ToS) field, Transmission Control Protocol/User Datagram Protocol (TCP/UDP) port number, packet length, protocol ID, and Multiprotocol Label Switched (MPLS) label.

17. The network configured for flow mirroring of claim 15, further comprising means for mirroring one or more specific flows in a Link Aggregation Group.

18. The network configured for flow mirroring of claim 15, further comprising a management system in communication with the plurality of network elements, wherein the management system comprises one of a Network Management System, Element Management System, Craft Interface, and combinations thereof.

19. The network configured for flow mirroring of claim 15, wherein the management system is configured to control the means for mirroring one or more specific flows.

* * * * *